United States Patent Office 3,786,087
Patented Jan. 15, 1974

3,786,087
FLAME AND BURN RESISTANT BUTADIENE RESIN COMPOSITIONS
Wendell R. Conard, Kent, Ohio, and Ronald M. Ellis, Evanston, Ill., assignors to The Firestone Tire & Rubber Company, Akron, Ohio
No Drawing. Filed Oct. 26, 1971, Ser. No. 192,476
Int. Cl. C08f 29/08; C09k 3/28
U.S. Cl. 260—41.5 A               6 Claims

ABSTRACT OF THE DISCLOSURE

Tetrabromobenzene strongly inhibits flammability and burning of polybutadiene resins.

FIELD OF THE INVENTION

This invention relates to the flame- and burn-proofing of butadiene polymer and copolymer resins (both hereinafter designated "polybutadiene resins") by the incorporation therein of 2,3,5,6-tetrabromobenzene (hereinafter referred to simply as "tetrabromobenzene"). The products are particularly suitable for electrically insulating structural members where a combination of good electrical properties, fire- and flame-resistance, mechanical strength, and resistance to heat-distortion are necessary.

BACKGROUND OF THE INVENTION

Polybutadiene resins, particularly those having, in uncured state, a high proportion of the butadiene units incorporated in 1,2-configuration, have come into considerable use, particularly as electrically insulating structural elements, due to their excellent mechanical and electrical properties. Such applications often require further a high degree of flame- and burning-resistance; however, these properties are not easily achieved in this particular class of resins. Most conventional organic flame-resistance-imparting materials which might be incorporated into such resins are either incompatible, ineffective in the amounts which are tolerable, or (what amounts to the same thing) must be used in such large proportions as to adversely affect the physical and/or electrical properties of the products. Of the inorganic flame-resisters, antimony oxide ($Sb_2O_3$) is an effective agent; however it is expensive, and the principal sources thereof are unreliable. Phosphate compounds are helpful but by themselves are inadequate.

The tetrabromobenzene employed in this invention has heretofore been incorporated into polyester, polystyrene and polyurethane resins (British Pats. 1,079,984; 1,100,-605 and 1,107,283; Reinforced Plastics (London) 11 (12), 357–60 (1970). However, it does not appear ever to have been employed in a context entailing the problems encountered with the butadiene-based resins involved in the present invention.

Accordingly, it is an object of the invention to provide a novel and effective flame- and burning-resistant system for the polybutadiene resins.

Another object is to provide such a system which will eliminate dependence upon the expensive and procurement-vulnerable antimony oxide, or alternatively to reduce such dependence.

SUMMARY OF THE INVENTION

The above and other objects are secured, in accordance with this invention, in compositions comprising:

|  | Parts by weight |
|---|---|
| Polybutadiene resin | 100 |
| 2,3,5,6-tetrabromobenzene | [1] 8–35 |
| Adjuvant flame- and burning-resistance agents (phosphates, hydrated alumina, etc.) | 0–30 |

[1] Preferably 10–20.

The above ingredients are, of course, exclusive of inert inorganic filling and reinforcing materials such as glass fiber, glass fabric, asbestos, calcium carbonate, silica and the like. The amount of tetrabromobenzene may be varied within the cited limits, depending on the level of flame- and burning-resistance necessary for the application at hand; within the cited range, greater quantities of tetrabromobenzene provide greater degrees of protection.

DESCRIPTION OF THE PREFERRED EMBODIMENTS

The polybutadiene resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or cationic catalysts to a relatively low molecular weight, say 1000–200,000, so that they are of at least a flowable consistency. These low molecular weight (co) polymers are then incorporated with any desired fillers, reinforcing fibers or fabrics, pigments, etc. (including in case of the present invention, the tetrabromobenzene and/or adjuvants), peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25° or about 0.68 taken at 30° C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$— where R independently in each occurrence represents a hydrocarbon radical of 1–20 carbon atoms), and heating the polymers, usually under pressure. The curing temperature is advantageously at least 250° F. (120° C.), preferably about 300–350° F. (150–180° C.). Generally, no advantage in the process or product is obtained by exceeding a temperature of 420° F. (215° C.). Obviously, the higher the temperature the shorter will be the curing time required. Generally at 350° F. (180° C.) a satisfactory cure is obtained in less than four minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60 volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

The adjuvant anti-flame and anti-burning agents

The tetrabromobenzene may be used as the sole anti-flame and burning agent in the practice of this invention, and, as the proportions thereof are increased, will provide flame- and burn-resistance in increasing degree up to any reasonably demanded level. This is a very considerable advantage, since many other agents are either expensive and/or not reliably available, as for instance is the case with combinations of antimony trioxide with halogen compounds, the most effective flame-resisting systems heretofore developed. However, these other conventional anti-flame agents may be used along with the tetrabromobenzene and, for any given level of flame-resistance required for the end use, will permit a reduction in the amount of tetrabromobenzene required for that given level of flame-resistance. In certain cases, a synergistic effect has been observed between the tetrabromobenzene and other flame-resistant agents so that the introduction of the other flame-retardant agent will permit a disproportionate reduction of the amount of tetrabromobenzene required for a given level of flame resistance. This disproportionate reduction will be observed up to a replacement of as much as 50% of said required amount of tetrabromobenzene. Such synergism has been observed in the case of hydrated alumina ($2Al_2O_3 \cdot 3H_2O$).

The flame- and burning-resistant compositions of this invention may be incorporated with any of the conventional glass, cellulosic or other reinforcing fabrics and fibers, and with any of the usual pigments, fillers and the like. These components do not substantially affect the flame resistance, but they do affect the physical and mechanical properties of the cured articles made therefrom. The tetrabromobenzene, in the amounts used in the practice of this invention, does not detract significantly from the physical, mechanical, thermal or electrical properties of the finished cured articles.

With the foregoing general discussion in mind, there are given herewith detailed examples of the practice of this invention. All parts and percentages given are by weight.

EXAMPLE I

| | |
|---|---:|
| High 1,2-polybutadiene resin solution [1] __grams__ | [2] 220 |
| Hexane _____ ml__ | 100 |
| Silica (325 mesh) _____ grams__ | 380 |
| Tetrabromobenzene _____ do____ | [3] 0–15 |
| Dicumyl peroxide mixture (40% active) __do____ | 10 |

[1] 45% solution in hexane of a butadiene homopolymer: 90% of butadiene units in 1,2-configuration; molecular weight parameters, $M_w$=29,000, $M_n$=23,000, DSV=0.3.
[2] 100 grams dry resin.
[3] Per Table I.

A series of compositions was made up in accordance with the above recipe, varying the tetrabromobenzene from run to run as indicated in Table I. In each run, the ingredients, in the order listed, were mixed together in a planetary mixer. When the materials had become homogeneously mixed together, the batch was spread out in a tray, air-dried at 25° C. for 24 hours and then vacuum dried for an additional 24 hours at 0° C. Test plaques 6″ x 6″ x 0.1″ were then molded in a laboratory press at 350° F. for five minutes under a total load of twenty tons normal to the faces of the plaques. Rockwell hardness and burning resistance ratings according to ASTM–D–635–68 were determined for the several specimens and are set forth in Table I.

TABLE I

| Run number | 1 | 2 | 3 |
|---|---|---|---|
| Tetrabromobenzene used (grams) | 0 | 10 | 15 |
| Properties: | | | |
| Rockwell hardness (E-scale) | 90 | 85 | 84 |
| Ignition time (seconds) | 30 | 30 | 30 |
| Burning time (seconds) | 85 | 49 | 52 |
| Burning distance (inches) | 0.24 | 0.04 | 0.05 |
| Vertical burning time (seconds) | 109 | [1] 163 | |

[1] Slower.

The critical figure is the "burning distance," and it will be seen that Runs 2 and 3, using tetrabromobenzene, showed negligible values of this figure, which is highly desirable. Burning time is the time required for the flame to spontaneously be extinguished; shorter burning times are desirable. Also the "*vertical* burning time" (as distinguished from "burning time") of 163 seconds for Run No. 2 indicates a slower rate of burning in comparison with Run No. 1; in the "vertical burning time" test, the time is measured until the specimen is completely consumed, hence for this test increased *vertical* burning time is desirable (other results being satisfactory), since this reflects a slower burning rate. These comments, of course, apply also to the results set forth in Tables II–IV hereinbelow.

EXAMPLE II

Blends containing polyethylene

| | |
|---|---:|
| High 1,2-polybutadiene resin solution (as in Example I) _____ grams__ | [1] 220 |
| Hexane _____ ml__ | 100 |
| Polyethylene ("Microthene," a product of U.S.I. Co.) _____ grams__ | 20 |
| Silica (325 mesh) _____ do____ | 380 |
| Antimony trioxide _____ do____ | [2] 0–5 |
| Tetrabromobenzene _____ do____ | [2] 0–15 |
| Dicumyl peroxide mixture (40% active) __do____ | 10 |

[1] 100 grams dry resin.
[2] Per Table II.

A series of compositions was made up in accordance with the above schedule, varying the tetrabromobenzene and antimony trioxide from run to run as set forth in Table II. The compositions were cured and evaluation in accordance with the procedure and testing of Example I. Set forth herewith in Table II are the results of the several runs.

TABLE II

| Run number | 4 | 5 | 6 | 7 |
|---|---|---|---|---|
| Constituents: | | | | |
| Tetrabromobenzene (grams) | 0 | 10 | 15 | 15 |
| Antimony trioxide | 0 | 0 | 0 | 5 |
| Properties: | | | | |
| Rockwell hardness (E-scale) | 73 | 70 | 72 | 66 |
| Ignition time (seconds) | 30 | 30 | 30 | 30 |
| Burning time (seconds) | 96 | 66 | 56 | 53 |
| Burning distance (inches) | 0.30 | 0.19 | 0.02 | 0.02 |
| Vertical burning time (seconds) | 152 | | 206 | 219 |

Again it will be seen that the use of tetrabromobenzene in Runs 5–7 reduced the burning time and distance. The additional use of antimony oxide in Run 7 does not appear to have made any significant difference. A desirable increase in vertical burning time will be noted at the higher levels of tetrabromobenzene (Runs Nos. 6 and 7).

EXAMPLE III

Butadiene/styrene copolymers

| | | |
|---|---|---|
| High 1,2-butadiene/styrene copolymer resin solution [1] | grams | [2] 220 |
| Hexane | ml | 100 |
| Glass powder | grams | 80 |
| Atomite | do | [3] 160–220 |
| Glass fiber | do | [3] 0–40 |
| Tetrabromobenzene | do | [3] 0–30 |
| Antimony trioxide | do | [3] 0–10 |
| Dicumyl peroxide mixture (40% active) | do | 10 |

[1] 45 weight-percent solution in hexane of a copolymer of 60% butadiene, 40% styrene; 90% of butadiene units in cis-configuration. DSV=0.33.
[2] 100 grams dry resin.
[3] Per Table III.

A series of compositions was made up, cured and tested in accordance with the above schedule, using the procedure of Example I. Following are the results from the several runs.

TABLE III

| Run number | 8 | 9 | 10 | 11 | 12 | 13 | 14 |
|---|---|---|---|---|---|---|---|
| Ingredients (grams): | | | | | | | |
| Tetrabromobenzene | 0 | 0 | 20 | 20 | 20 | 20 | 30 |
| Glass fiber | 40 | 0 | 40 | 40 | 40 | 0 | 0 |
| Atomite | 180 | 220 | 180 | 170 | 160 | 220 | 220 |
| Antimony trioxide | 0 | 0 | 0 | 10 | 0 | 0 | 0 |
| Zinc borate | 0 | 0 | 0 | 0 | 20 | 0 | 0 |
| Properties: | | | | | | | |
| Rockwell hardness (E-scale) | 51 | 62 | 42 | 43 | 48 | 47 | 40 |
| Ignition time (seconds) | 30 | 30 | 30 | 30 | 30 | 30 | 30 |
| Burning time (seconds) | 591 | 433 | 66 | 81 | 61 | 57 | 48 |
| Burning distance (inches) | 4.0 | 3.0 | 0.00 | .00 | .00 | .04 | 0 |
| Vertical burning time (seconds) | 176 | 189 | 229 | 203 | 266 | 210 | 211 |

Again the use of tetrabromobenzene (Runs 10–14) will be seen to result in negligible burning distance. The sample containing antimony trioxide was actually poorer than its control (Runs 11 vs. Run 10). The zinc borate (Run 12), however, shows definite benefit. Again, the mixtures containing tetrabromobenzene (Nos. 10–14) show enhanced vertical burning time.

EXAMPLE IV

Alumina adjuvant

| | | |
|---|---|---|
| High 1,2-polybutadiene resin solution (as in Example I) | grams | 200 |
| Hexane | ml | 100 |
| Polyethylene ("Microthene," a product of U.S.I.) | grams | 20 |
| Alumina ("Aluminum C–331," a hydrated aluminum oxide, $2Al_2O_3 \cdot 3H_2O$ manufactured by Aluminum Company of America) | grams | 380 |
| Tetrabromobenzene | do | [1] 0–15 |
| Thermogard B (a product of M & T Chemicals, Inc.) | grams | [1] 0–5 |
| Dicumyl peroxide mixture (40% active) | do | 10 |

[1] Per Table IV.

A series of compositions was made, cured and tested, varying the ingredients as indicated in Table IV and using the procedure of Example I. Following are the results:

TABLE IV

| Run number | 15 | 16 | 17 | 18 |
|---|---|---|---|---|
| Constituents: | | | | |
| Tetrabromobenzene (grams) | 0 | 10 | 15 | 15 |
| Thermogard B (grams) | 0 | 0 | 0 | 5 |
| Properties: | | | | |
| Rockwell hardness (E-scale) | 63 | 62 | 67 | 14 |
| Ignition time (seconds) | 80 | 103 | 129 | 180 |
| Burning time (seconds) | 72 | 97 | 83 | 53 |
| Burning distance (inches) | 0 | 0 | 0 | 0 |
| Vertical burning time (seconds) | 0 | 0 | 0 | 231 |

It will be noted that the ignition time was greatly increased by the tetrabromobenzene (Runs 16–18) so that they would be classified "non-burning" under ASTM–D–635, a very desirable result. On account of the rather heavy loading of alumina, it was necessary to apply the ignition flame for a much longer time ("ignition time") than the 30 seconds specified in the ASTM–D–635–68. This excessively long application of the ignition required to start burning caused volatilization of a portion of the tetrabromobenzene, invalidating the remaining results.

EXAMPLE V

Butadiene/styrene copolymer alumina adjuvant

| | | |
|---|---|---|
| High 1,2-butadiene/styrene copolymer resin solution (as in Example III) | grams | [1] 220 |
| Alumina (as in Example IV) | do | 220 |
| Silica glass | do | 80 |
| Tetrabromobenzene | do | [2] 0 or 20 |
| Dicumyl peroxide mixture (40% mixture) | grams | 10 |

[1] 100 grams dry resin.
[2] Per Table V.

Two compositions were prepared and cured in accordance with the procedure of Example I, one with, and one without, the tetrabromobenzene. The results are set forth herewith in Table V.

TABLE V

| Run number | 19 | 20 |
|---|---|---|
| Tetrabromobenzene used (grams) | 0 | 20 |
| Properties: | | |
| Rockwell hardness (E-scale) | ----- | 63 |
| Burning time (seconds) | 398 | 71 |
| Burning distance (inches) | 2.67 | 0.04 |
| Vertical burning time (seconds) | 199 | 238 |

What is claimed is:

1. A peroxide cross-linked flame- and burning-resistant composition comprising

| | Parts |
|---|---|
| A butadiene resin | 100 |
| 2,3,5,6-tetrabromobenzene | 5–35 | said butadiene resin prior to cross-linking being characterized by

| | |
|---|---|
| Percent of butadiene units in 1,2-configuration | At least 80 |
| Average molecular weight | 12,500–55,000 |
| Percent of polymer having molecular weight above 2000 | At least 95 |
| Percent of polymer having molecular weight above 10,000 | At least 90 |
| Dilute solution viscosity | 0.19–0.7 |

2. A composition according to claim 1, wherein the composition contains from 10 to 25 parts of 2,3,5,6-tetrabromobenzene per 100 parts of resin.

3. Composition according to claim 1, which further contains up to 30 parts of zinc borate as an adjuvant flame-resister.

4. Composition according to claim 1, which further contains up to 30 parts of hydrated aluminum oxide as an adjuvant flame-resister.

5. A glass fiber reinforced article having a matrix of the cured resin of claim 1.

6. Article according to claim 5, containing 10 to 28 parts of 2,3,5,6-tetrabromobenzene per 100 parts of resin.

References Cited
UNITED STATES PATENTS

| | | | |
|---|---|---|---|
| 2,216,835 | 10/1940 | Carothers | 260—33.8 |
| 2,979,537 | 4/1961 | Asadorian | 260—650 |
| 3,385,819 | 5/1968 | Gouinlock, Jr. | 260—45.75 |
| 3,535,300 | 10/1970 | Gable | 260—29.1 |
| 3,586,661 | 6/1971 | Parris et al. | 260—85.3 |
| 3,595,815 | 7/1971 | Willersinn et al. | 260—2.5 |
| 3,635,850 | 1/1972 | Birkner et al. | 260—2.5 |
| 3,635,934 | 1/1972 | Schaffhauser et al. | 260—94.7 |
| 3,639,298 | 2/1972 | Lister et al. | 260—2.5 |
| 3,639,299 | 2/1972 | Macdowall | 260—2.5 |
| 3,660,346 | 5/1972 | Gray et al. | 260—41 |
| 3,262,894 | 7/1966 | Green | 260—2.5 |
| 3,524,761 | 8/1970 | Humphrey | 117—138 |
| 3,639,304 | 2/1972 | Raley, Jr. | 260—2.5 |

DONALD E. CZAJA, Primary Examiner

R. A. WHITE, Assistant Examiner

U.S. Cl. X.R.

260—45.7 R, 45.75 R, 94.7 A

PO-1050
(5/69)

UNITED STATES PATENT OFFICE
CERTIFICATE OF CORRECTION

Patent No. 3,786,087      Dated January 15, 1974

Inventor(s) WENDELL R. CONARD and RONALD M. ELLIS

It is certified that error appears in the above-identified patent and that said Letters Patent are hereby corrected as shown below:

In Column 1, Line 54, after "1970" there should be a double parentheses --))--.

In Column 4, Line 8, "0°C." should be --70°C.--.

In Column 4, Line 56, "evaluation" should be --evaluated--.

In Column 5, Line 38, "Runs" should be --Run--.

In Column 5, Example IV, Line 46, the first occurrence, "200" should be --220--.

Signed and sealed this 19th day of November 1974.

(SEAL)
Attest:

McCOY M. GIBSON JR.
Attesting Officer

C. MARSHALL DANN
Commissioner of Patents